United States Patent
Lim et al.

(10) Patent No.: US 9,483,598 B2
(45) Date of Patent: Nov. 1, 2016

(54) INTELLECTUAL PROPERTY BLOCK DESIGN WITH FOLDED BLOCKS AND DUPLICATED PINS FOR 3D INTEGRATED CIRCUITS

(71) Applicant: QUALCOMM Incorporated, San Diego, CA (US)

(72) Inventors: Sung Kyu Lim, Duluth, GA (US); Kambiz Samadi, San Diego, CA (US); Yang Du, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/617,896

(22) Filed: Feb. 9, 2015

(65) Prior Publication Data

US 2016/0232271 A1    Aug. 11, 2016

(51) Int. Cl.
    *G06F 17/50* (2006.01)
(52) U.S. Cl.
    CPC .................. *G06F 17/5072* (2013.01)
(58) Field of Classification Search
    CPC .................................... G06F 17/5068
    USPC ........................................ 716/119
    See application file for complete search history.

(56) References Cited

U.S. PATENT DOCUMENTS

| | | | |
|---|---|---|---|
| 7,949,984 B2 | 5/2011 | Tanamoto et al. | |
| 8,239,809 B2 | 8/2012 | Fujita | |
| 8,381,156 B1* | 2/2013 | Beakes ............... | G06F 17/5081 716/110 |
| 8,769,453 B2 | 7/2014 | Scheffer et al. | |
| 8,972,916 B1* | 3/2015 | Hsieh ................... | G06F 17/504 716/102 |
| 2012/0304138 A1* | 11/2012 | Farooq ................ | G06F 17/5081 716/111 |
| 2012/0304142 A1* | 11/2012 | Morimoto ........... | G06F 17/5045 716/119 |
| 2014/0149958 A1 | 5/2014 | Samadi et al. | |

OTHER PUBLICATIONS

Jung M., et al., "How to Reduce Power in 3D IC Designs: A Case Study with OpenSPARC T2 Core," IEEE Custom Integrated Circuits Conference (CICC), 2013, pp. 1-4.
Knechtel J., et al., "Assembling 2D Blocks into 3D Chips," Proceedings of the 2011 international symposium on Physical design (ISPD), 2011, pp. 81-88.
Ahn B-G., et al., "Effective Estimation Method of Routing Congestion at Floorplan Stage for 3D ICs", JSTS: Journal of Semiconductor Technology and Science, vol. 11, No. 4, Dec. 31, 2011 (Dec. 31, 2011), pp. 344-350, XP055265074, ISSN: 1598-1657, DOI: 10.5573/JSTS.2011.11.4.344.
International Search Report and Written Opinion—PCT/US2016/014032 ISA/EPO—Apr. 20, 2016.

(Continued)

*Primary Examiner* — Suresh Memula
(74) *Attorney, Agent, or Firm* — Muncy, Geissler, Olds & Lowe, P.C.

(57) ABSTRACT

An intellectual property (IP) block design methodology for three-dimensional (3D) integrated circuits may comprise folding at least one two-dimensional (2D) block that has one or more circuit components into a 3D block that has multiple tiers, wherein the one or more circuit components in the folded 2D block may be distributed among the multiple tiers in the 3D block. Furthermore, one or more pins may be duplicated across the multiple tiers in the 3D block and the one or more duplicated pins may be connected to one another using one or more intra-block through-silicon-vias (TSVs) placed inside the 3D block.

21 Claims, 9 Drawing Sheets

(56) References Cited

OTHER PUBLICATIONS

Jung M., et al., "On Enhancing Power Benefits in 3D ICs: Block Folding and Bonding Styles Perspective", DAC '14 Proceedings of the 51st Annual Design Automation Conference, New York, NY, USA, Jun. 1-5, 2014, 6 pages.

Tsai M-C., et al., "Through-Silicon Via Planning in 3-D Floorplanning", IEEE Transactions on Very Large Scale Integration (VLSI) Systems, IEEE Service Center, Piscataway, NJ, USA, vol. 19, No. 8, Aug. 1, 2011 (Aug. 1, 2011), pp. 1448-1457, XP011336680, ISSN: 1063-8210, DOI: 10.1109/TVLSI.2010.2050012.

\* cited by examiner

3D LSU - Top Tier

3D LSU - Bottom Tier

*FIG. 7B*

T2 Core with 3D LSU

*FIG. 7C*

T2 Core with 2D LSU

INTELLECTUAL PROPERTY BLOCK DESIGN WITH FOLDED BLOCKS AND DUPLICATED PINS FOR 3D INTEGRATED CIRCUITS

TECHNICAL FIELD

The disclosure generally relates to integrated circuits, and in particular, to creating intellectual property (IP) blocks to be used in three-dimensional integrated circuit design for low power and high performance applications.

BACKGROUND

In electronic design automation, an integrated circuit (IC) floorplan schematically represents tentative placement of the major functional blocks associated with the IC. In modern electronic design processes, floorplans are typically created during the floorplanning stage, which is an early stage in the hierarchical approach to chip design. Floorplanning takes into account some of the geometrical constraints in a design, including, for example, the location of bonding pads for off-chip connections. Furthermore, in electronic design, an intellectual property (IP) block (or IP core) refers to a reusable logic unit, cell, or chip layout design that is considered the intellectual property of a particular party. As such, IP blocks may be used as building blocks within IC designs by parties that have licensed and/or own the intellectual property that exists in the design (e.g., patents, source code copyrights, trade secrets, know-how, etc.). In general, there may be various advantages to using three-dimensional (3D) IP blocks in combination with 2D IP blocks to improve the overall quality of full-chip 3D IC designs.

For example, a 3D semiconductor device (or stacked IC device) can contain two or more semiconductor devices that are stacked vertically and thereby occupy less space than two or more conventionally arranged semiconductor devices. The stacked IC device is a single integrated circuit built by stacking silicon wafers and/or ICs that are interconnected vertically so as to behave as a single device. Conventionally, the stacked semiconductor devices are wired together using input/output (I/O) ports at the perimeter of the device and/or across the area of the device. The I/O ports slightly increase the length and width of the assembly. In some new 3D stacks, a technique referred to as Through Silicon Stacking (TSS) uses through-silicon-vias (TSVs) to completely or partly replace edge wiring by creating vertical connections through the body of the semiconductor device such that stacked IC devices can pack substantial functionality into a small footprint. However, device scaling and interconnect performance mismatch has increased exponentially and is expected to continue to increase even further. This exponential increase in device and interconnect performance mismatch has forced designers to use techniques such as heavy buffering of global interconnects, which increases chip area and power consumption.

As such, current 3D methodologies that focus on assembling 2D blocks into 3D stacks only help to reduce the inter-block nets, if applicable, without leveraging the 3D IC within the blocks and leaving further improvements on the table. On the other hand, starting from an existing 2D IP block, a technique called "block folding" can perform tier partitioning and redo placement and routing for all tiers under the same footprint in order to create 3D IP blocks and thereby build the final 3D IP layout. However, existing techniques that utilize block folding do not address how to place I/O pins in the folded 3D IP blocks, which may have a major impact on the final 3D IC design quality in terms of wirelength, area, and the number of TSVs used for inter-block connections.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to various exemplary aspects, an intellectual property (IP) block design methodology for a three-dimensional (3D) integrated circuit may comprise folding at least one two-dimensional (2D) block that has one or more circuit components into a 3D block that has multiple tiers, wherein the one or more circuit components in the folded 2D block may be distributed among the multiple tiers in the 3D block. Furthermore, one or more pins may be duplicated across the multiple tiers in the 3D block and the one or more duplicated pins may be connected to one another using one or more intra-block through-silicon-vias (TSVs) placed inside the 3D block (e.g., to provide a vertical connection between the duplicated pins). Furthermore, in various embodiments, one or more other blocks in the 3D integrated circuit may each be connected to one of the duplicated pins according to tier locations associated therewith and the 3D block and the one or more other blocks may then be packed into a final full-chip design associated with the integrated circuit, wherein the one or more pins that are duplicated across the multiple tiers in the 3D block may be chosen to minimize a total wirelength and footprint area in the full-chip design and/or according to shared space available across the multiple tiers in the 3D block.

According to various exemplary aspects, a 3D intellectual property block may comprise multiple tiers, one or more circuit components distributed across the multiple tiers, and one or more pins that are duplicated across the multiple tiers. For example, in various embodiments, the 3D intellectual property block may comprise a 2D intellectual property block that has been folded into the multiple tiers and re-implemented to distribute and interconnect the one or more circuit components among the multiple tiers in the 3D intellectual property block. Furthermore, in various embodiments, the 3D intellectual property block may comprise one or more through-silicon-vias that are placed inside the 3D block to connect the one or more pins that are duplicated across the multiple tiers and to provide a vertical connection between the one or more duplicated pins.

According to various exemplary aspects, a 3D integrated circuit may comprise at least one 3D block having one or more circuit components distributed across multiple tiers and one or more pins that are duplicated across the multiple tiers and at least one additional block located on one of the multiple tiers, wherein the at least one additional block is connected to one of the duplicated pins in the at least one 3D block according to the at least one tier on which the at least one additional block is located. For example, in various embodiments, the at least one 3D block may comprise a 2D block that has been folded into the multiple tiers and re-implemented to distribute and interconnect the one or more circuit components among the multiple tiers. Furthermore, in various embodiments, the at least one 3D block may additionally comprise one or more intra-block through-silicon-vias that connect the one or more duplicated pins, wherein the duplicated pins may be chosen to minimize a total wirelength and a footprint area associated with the 3D integrated circuit.

Other objects and advantages associated with the various aspects and/or embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings to show examples directed to specific exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each aspect and/or embodiment described herein, the corresponding form of any such aspect and/or embodiment may be described herein as, for example, "logic configured to" perform the described action.

Figure 1:
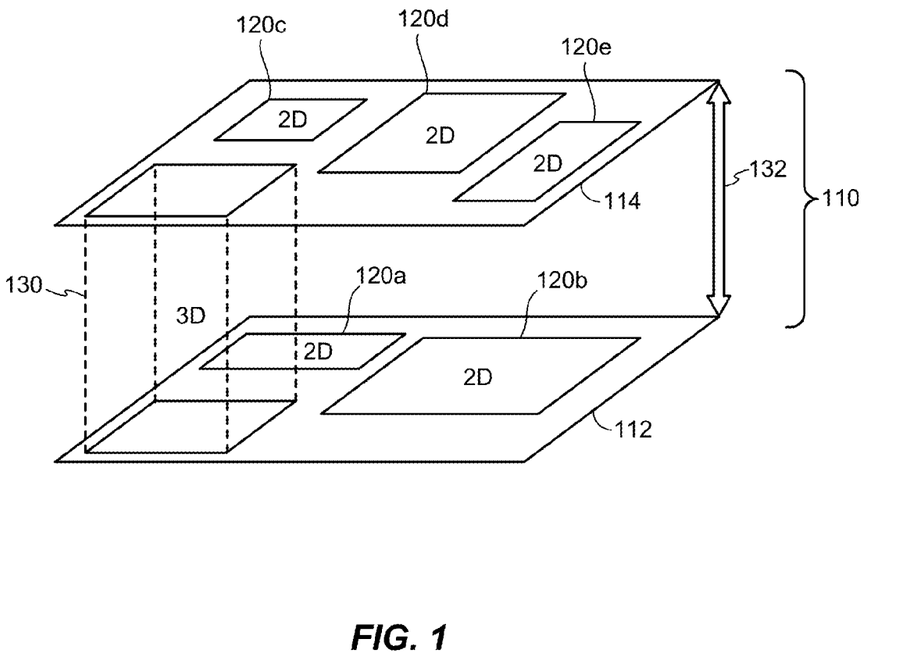
FIG. 1 illustrates an exemplary multi-tier three-dimensional (3D) integrated circuit (IC) floorplan that implements one or more two-dimensional (2D) blocks in combination with one or more 3D blocks, according to various aspects.

According to various embodiments, FIG. 1 illustrates an exemplary multi-tier three-dimensional (3D) integrated circuit (IC) floorplan 110 that implements one or more two-dimensional (2D) blocks in combination with one or more 3D blocks. More particularly, the overall multi-tier 3D IC floorplan 110 is 3D in that the floorplan 110 includes a first tier 112, a second tier 114, and a 3D block 130 spanning the first tier 112 and the second tier 114. Furthermore, as shown in FIG. 1, the remaining blocks 120a, 120b, 120c, 120d, 120e in the 3D IC floorplan 110 are implemented in 2D and distributed among the first tier 112 and the second tier 114 (i.e., 2D blocks 120a, 120b are implemented in the first tier 112, while 2D blocks 120c, 120d, 120e are implemented in the second tier 114). Furthermore, the arrow 132 in FIG. 1 may represent a via network having one or more vias (e.g., through-silicon-vias (TSVs), which may provide communication paths in the multi-tier 3D IC 110 (e.g., between at least the first tier 112 and the second tier 114). In various embodiments, the multi-tier 3D IC floorplan 110 shown in FIG. 1 may be built according to an appropriate methodology that can fold one or more existing 2D blocks and/or one or more existing 3D blocks to build the final multi-tier 3D IC layout 110.

Figure 2:
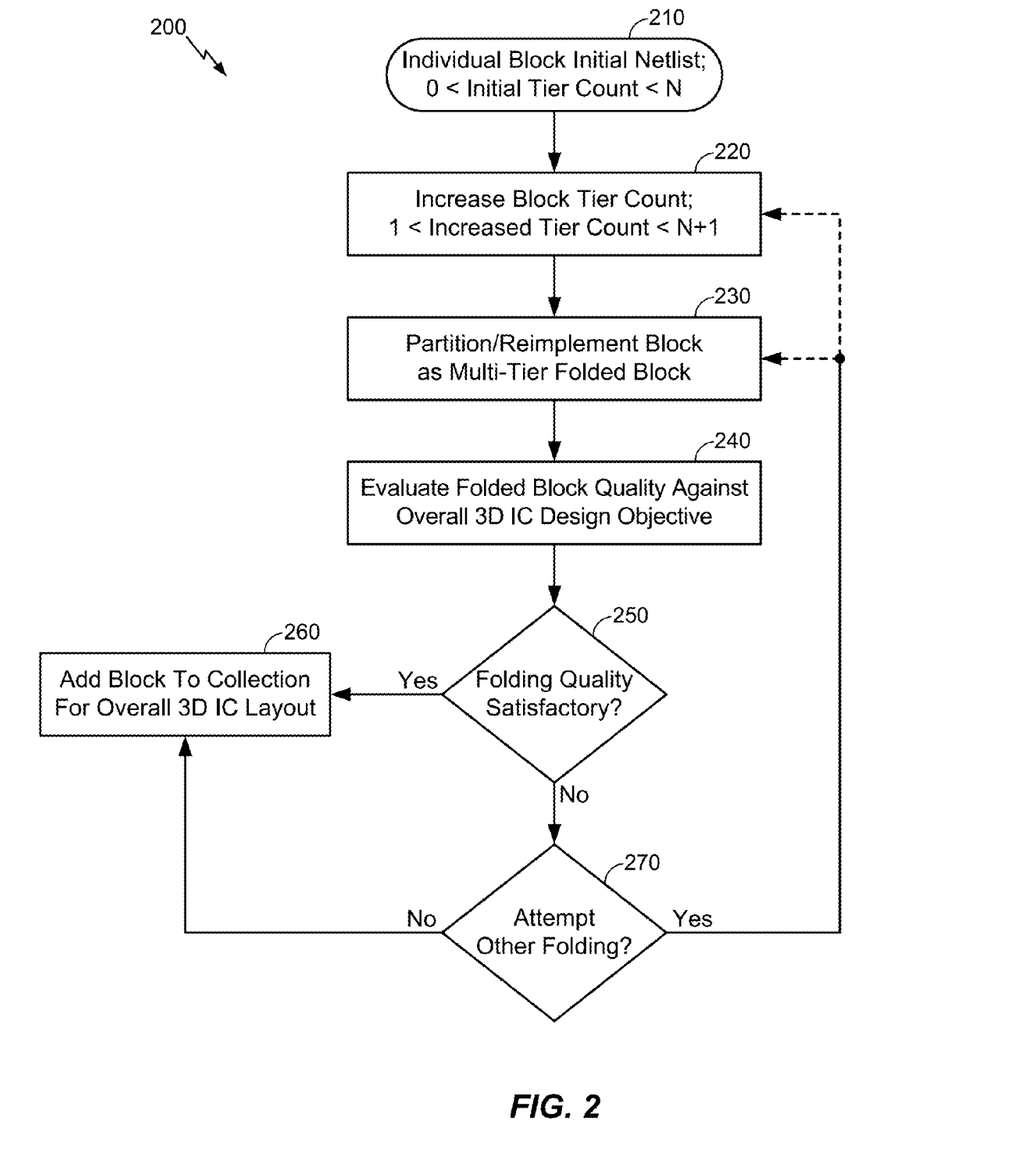
FIG. 2 illustrates an exemplary methodology to fold one or more existing 2D and/or 3D blocks that can subsequently be packed into a final multi-tier 3D IC layout according to power, performance, and other design quality objectives associated with the overall multi-tier 3D IC layout, according to various aspects.

For example, according to various embodiments, FIG. 2 illustrates an exemplary methodology 200 that may fold one or more existing 2D blocks and/or 3D blocks that can subsequently be packed together into a final multi-tier 3D IC layout according to power, performance, and other design quality objectives associated with the overall multi-tier 3D IC layout (e.g., the 3D IC layout 110 shown in FIG. 1). In general, the methodology 200 shown in FIG. 2 may be applied with respect to individual blocks and 3D floorplanning can then be carried out to pack multiple blocks (including any individual blocks that are folded according to the methodology 200 shown in FIG. 2) into the final multi-tier 3D IC design.

In various embodiments, as described in further detail herein, the methodology 200 shown in FIG. 2 may generally re-characterize or otherwise re-implement an existing individual 2D block and/or an existing individual 3D block into multiple counterparts that can then be evaluated against an overall design quality objective associated with the overall 3D IC design (e.g., whether the individual block improves a power and performance envelope associated with the entire multi-tier 3D IC after having been partitioned and folded into a multi-tier 3D block). For example, because certain individual blocks may perform better when folded across multiple tiers, the methodology 200 shown in FIG. 2 may generally perform tier partitioning on an individual block and re-implement placement and routing for all tiers under the same footprint to further expand and re-implement the individual block for the final multi-tier 3D IC design, provided that the folded block outperforms the constituent block that existed prior to the folding.

In various embodiments, the methodology 200 may start with an initial netlist that corresponds to a particular individual block at 210, wherein the individual block initial netlist may include one or more existing 2D blocks and/or one or more existing 3D blocks (e.g., a Boolean algebra representation corresponding to a logical function implemented as generic gates or process specific standard cells). Furthermore, in context with the overall 3D IC layout, the individual block may have an initial tier count greater than zero and less than N, where N represents the total number of tiers in the overall 3D IC layout, which is usually fixed (e.g., to four total tiers). Accordingly, the initial tier count associated with the individual block may fall in a range between one and N, wherein an individual block that occupies one tier may be considered a 2D block and an individual block that occupies more than one tier may be a 3D block. As such, to attempt folding with respect to the individual block, the initial tier count associated with the individual block may be increased at 220. For example, because the overall 3D IC layout has N total tiers and adding one or more additional tiers tends to be very expensive and not recommended, the tier count associated with the individual block can vary between one and N. Accordingly, at 220, the increased tier count associated with the individual block may be greater than one and less than N+1 (i.e., greater than or equal to two and less than or equal to N such that the individual block occupies multiple tiers but does not occupy more tiers than the overall 3D IC).

In various embodiments, the individual block associated with the initial netlist may then be re-implemented at 230, wherein re-implementing the individual block may include partitioning the initial netlist across the multiple tiers, re-implementing the placement and routing in each tier under the same footprint, and inserting one or more vias (e.g., high density inter-tier vias). In various embodiments, the quality associated with the partitioned and re-implemented (i.e., folded) block may then be evaluated against an overall design quality objective associated with the entire 3D IC to determine whether folding the individual blocks across the additional tier(s) that were added at 220 improved the overall 3D IC design quality. For example, the design quality objective may comprise a weighted sum of the total silicon area, timing, and power associated with the entire 3D IC, although those skilled in the art will appreciate that other suitable design quality objectives may be evaluated at 240. Furthermore, because the partitioned (folded) blocks tend to be much smaller than the entire 3D IC design, post-layout timing, power, and area values may be used to evaluate the overall 3D IC design quality objective at 240 to increase accuracy.

In various embodiments, at 250, a determination may be made as to whether the quality associated with the folded individual block is satisfactory with respect to the overall 3D IC design quality objective (i.e., whether folding and re-implementing the individual block across the additional tier(s) improved the overall 3D IC design quality). In the affirmative, the folded individual block may be added to a block collection for the overall 3D IC layout at 260, wherein the block collection will typically include multiple 2D and/or 3D blocks that are packed into the final 3D IC. However, in response to determining at 250 that the quality associated with the folded individual block is unsatisfactory with respect to the overall 3D IC design quality objective, the folding that was performed at steps 220 and 230 may not be added to the block collection to pack into the final 3D IC because the folding did not improve the overall 3D IC design quality. Accordingly, in the event that the quality associated with the folded individual block is deemed unsatisfactory at 250, other approaches to folding the block may be considered at 270. For example, one option may be to add more tiers at 220 and then re-attempt the folding at 230 to assess whether adding more tiers results in a folded block that improves the overall 3D IC design quality (unless that the unsatisfactory folded block had N tiers, in which case additional tiers cannot be added without exceeding the total tier count N in the overall 3D IC). Alternatively, another option may be to attempt a different partitioning at 230 with the same tier count. In still another alternative, the methodology 200 may stop if folding the individual block did not improve the overall 3D IC design quality, in which case the initial block design provided at 210 may be used in the final 3D IC because the initial block may be considered more satisfactory with respect to the overall 3D IC design quality than the folded blocks that were attempted. Accordingly, the methodology 200 may generally add individual blocks to the block collection for the overall 3D IC layout according to whether or not the individual blocks improve the overall 3D IC design quality when folded across additional tiers, whereby the block collection that is eventually packed into the final 3D IC may be optimized according to the overall 3D IC design quality objectives, whether through folding the individual blocks across additional tiers or using the original blocks.

Figure 3:
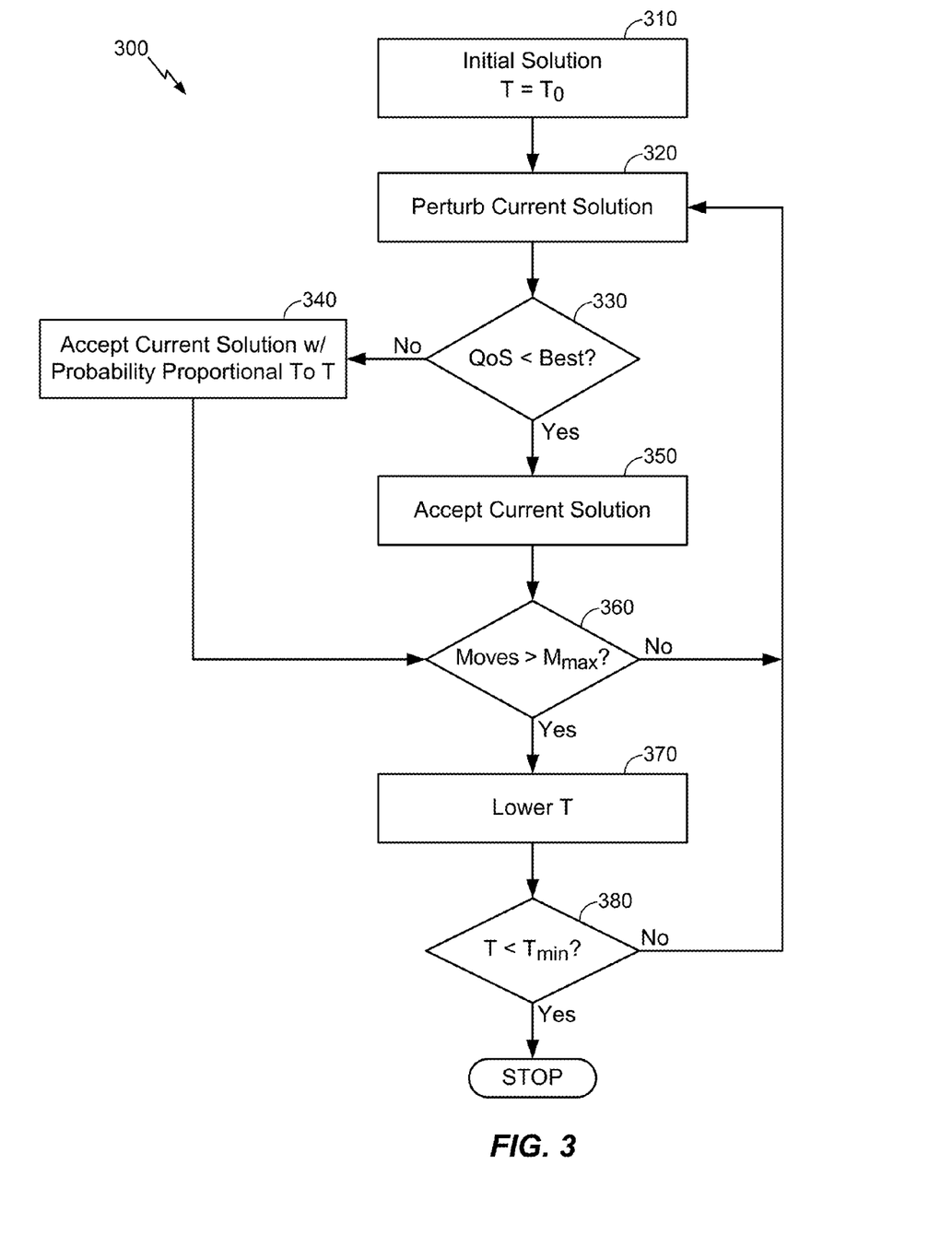
FIG. 3 illustrates an exemplary methodology to automatically floorplan a multi-tier 3D IC layout that combines one or more 2D and one or more 3D blocks to improve the quality associated with a full-chip multi-tier 3D IC design, according to various aspects.

According to various embodiments, FIG. 3 illustrates an exemplary methodology 300 to floorplan a multi-tier 3D IC layout that combines one or more 2D blocks with one or more 3D blocks to improve the overall quality associated with a full-chip multi-tier 3D IC design. More particularly, in order to build the final multi-tier 3D IC layout, various blocks (e.g., including the block collection developed at block 260 in FIG. 2) may be floorplanned into a multi-tier 3D stack, wherein each floorplanned block may start as a 2D and/or 3D implementation with varying number of tiers, timing, power, and area footprints. The objective may be determined by the weighted sum of the area footprint, wirelength, and delay, although other derivative objective functions could be considered depending on the specific design. The output may comprise (i) a choice to implement each block in 2D or 3D and (ii) the (x, y, z) coordinates of each block that may minimize the above objective function in the final full-chip multi-tier 3D IC design.

In various embodiments, the methodology 300 shown in in FIG. 3 may correspond to a simulated annealing framework that can implement an automated 3D floorplanning engine, wherein simulated annealing refers to an artificial intelligence technique based on the behavior of cooling metal. However, in practice, 3D floorplanning tends to be carried out manually rather than using automatic floorplanning with simulated annealing. In that context, the methodology 300 shown in FIG. 3 can provide one exemplary technique to perform 3D floorplanning in an automated manner in order to find solutions to difficult or impossible combinatorial optimization problems, although those skilled in the art will appreciate that the 3D floorplanning techniques used to pack multiple 2D and/or 3D blocks into a final 3D IC layout may be manually performed such that the methodology 300 shown in FIG. 3 only represents one possible 3D floorplanning option that can be used in connection with the various aspects and embodiments described herein.

For example, in various embodiments, the automated floorplanning methodology 300 shown in FIG. 3 may comprise identifying an initial solution at 310, which may include setting a global parameter T to an initial value $T_0$. Although the global parameter T may generally refer to a temperature, T is not necessarily related to a physical temperature. Instead, T may comprise a global parameter used to control advancement of the simulated annealing-based 3D floorplanning engine. In various embodiments, the initial solution may be perturbed at 320 and then evaluated at 330 to determine whether a quality of service (QoS) parameter is below a best level. For example, in various embodiments, the QoS parameter may provide different priority levels to different applications, users, or data flows, or to guarantee a certain level of performance to a data flow (e.g., a required bit rate, delay, jitter, packet dropping probability, bit error rate, etc.). In various embodiments, in response to determining at 330 that the QoS parameter is not below the best level associated therewith, the solution may be accepted at 340 with a probability proportional to T and the methodology 300 may then proceed to 360. Otherwise, in response to determining at 330 that the QoS parameter is below the best level, the solution may be accepted at 350 before proceeding to 360. In either case, a determination may be made as to whether the number of moves exceeds the maximum moves for a given T at 360, wherein the maximum moves for the given T may be set to $M_{max}$. In response to determining at 360 that the number of moves does not exceed $M_{max}$, the methodology 300 may return to 320 where the solution may be further perturbed. Otherwise, in response to determining at 360 that the number of moves exceeds $M_{max}$, the global parameter T may be lowered at 370 and an evaluation may be performed at 380 to determine whether the lowered value of T is now less than $T_{min}$ (e.g., a stopping "temperature"). In the affirmative, where the lowered value of T is less than $T_{min}$, the methodology 300 may stop. Otherwise, in response to determining at 380 that the lowered value of T is not less than $T_{min}$, the methodology 300 may return to 320 where the solution may be further perturbed.

Figure 4:
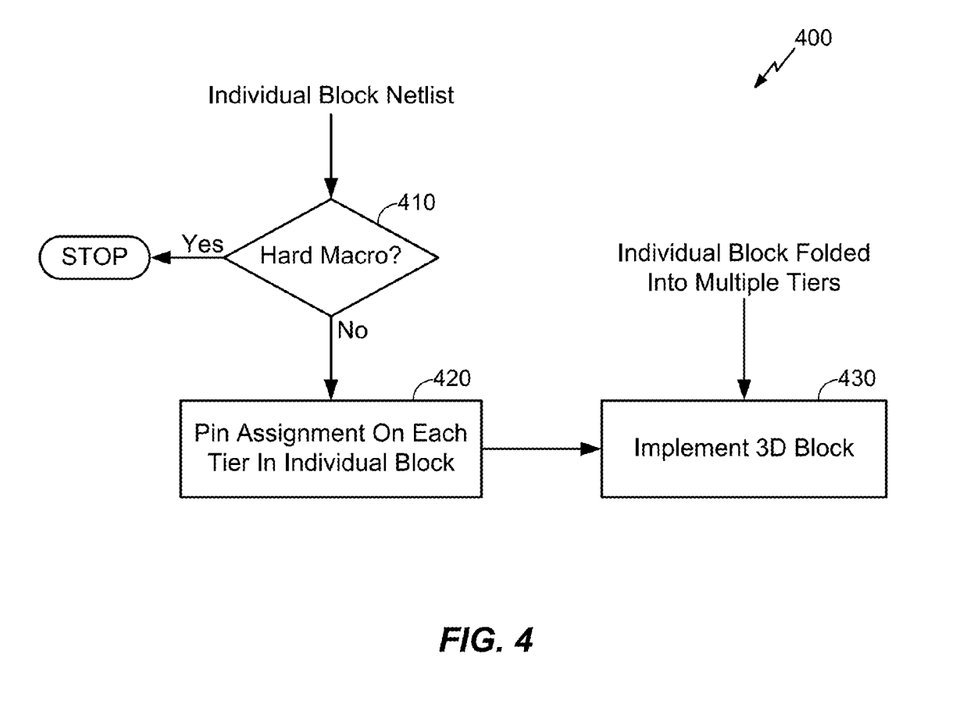
FIG. 4 illustrates an exemplary methodology for making pin assignments in a multi-tier 3D IC that combines one or more 2D blocks with one or more 3D blocks, according to various aspects.

According to various embodiments, FIG. 4 illustrates an exemplary methodology 400 for making pin assignments in a multi-tier 3D IC that combines one or more 2D blocks with one or more 3D blocks. More particularly, a netlist associated with an individual block may be evaluated at 410 to determine whether the individual block is a hard macro. For example, in a hard macro, the logic components and the physical pathways and wiring patterns between the components are specified. Accordingly, in response to determining that the individual block is a hard macro at 410, the pin assignment as well as the block design have already been done, in which case the methodology 400 may appropriately stop with respect to that individual block. On the other hand, in response to determining at 410 that the individual block is not a hard macro, the individual block may be considered a soft macro, meaning that the interconnections of the required logic components may have been specified but the physical wiring pattern has not been specified. Hence, in response to determining at 410 that the individual block is a soft macro (i.e., is not a hard macro), the pins may be assigned on each tier of the individual block at 420. Knowing the floorplan solution and the inter-block connectivity, the pin locations in the multi-tier 3D IC layout can now be fixed. Accordingly, using the pin assignments determined at 420 and a solution partitioning a block across multiple tiers, the 3D block may be implemented at 430, wherein the partitioning solution can be done using 2D methodologies, 3D methodologies, and/or combinations thereof.

In general, the block folding methodologies described in further detail above may have applications in 3D implementation technologies generally known as "monolithic." In monolithic 3D integrated circuits, electronic components and their connections (e.g., wiring) are built sequentially in layers on a single semiconductor wafer, which is then diced into 3D ICs. Initially, each subsequent layer has no devices, which may eliminate or substantially reduce a need for alignment, thereby resulting in greater integration density. Furthermore, a network of high density vias may provide communication paths in and among the tiers in monolithic 3D ICs. Further still, the block folding methodologies described above can be used to construct new 3D intellectual property (IP) blocks (or 3D IP cores) that can be used in designs that are built using monolithic 3D integration technology. Accordingly, the new 3D IP blocks can be utilized as reusable logic, cell, or chip layout units, which may be used in a larger design that includes the pre-designed 3D IP block. In the following description, the block folding methodologies described above are expanded upon to provide exemplary techniques on how to place input/output (I/O) pins in a folded 3D IP block created from an existing 2D IP block.

Figure 5:
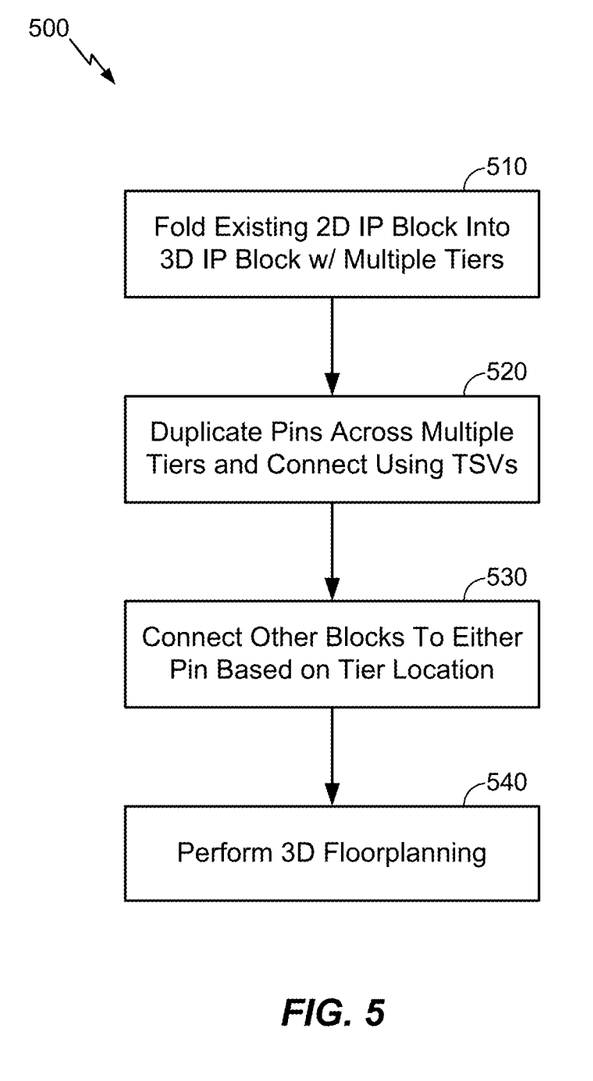
FIG. 5 illustrates an exemplary methodology for duplicating pin assignments in a multi-tier 3D block created from folding an existing 2D block, according to various aspects.

According to various embodiments, FIG. 5 illustrates an exemplary methodology 500 for duplicating pin assignments in a folded 3D IP block having multiple tiers. More particularly, an existing 2D IP block may be folded into the 3D IP block at 510, wherein folding the existing 2D IP block may comprise partitioning the 2D IP block into multiple tiers and re-implementing placement and routing for each tier under the same footprint (e.g., according to the methodologies 100, 200 shown in FIG. 1 and FIG. 2). In various embodiments, at 520, one or more pin locations may be assigned in a particular tier in the folded 3D IP block, wherein the pin locations be determined according to space shared among the multiple tiers in the folded 3D IP block in order to minimize total wirelength and the full-chip footprint area. Furthermore, at 520, one or more pins may be chosen and duplicated in each tier (e.g., one, some, or all pins), thereby making the duplicated pins available in more than one tier, and the duplicated pins may be vertically connected using one or more intra-block through-silicon-vias (TSVs) placed inside the folded 3D IP block or using any other suitable vertical via stack inside the folded 3D IP block. Accordingly, at 530, one or more other 2D and/or 3D blocks in the final full-chip design may connect to either duplicated pin depending on the tier location associated therewith, which may save on inter-block TSVs and allow tighter full-chip block-level floorplanning In various embodiments, at 540, 3D floorplanning may be performed to create the final multi-tier 3D layout associated with the full-chip design, wherein the 3D floorplanning may generally comprise packing the folded 3D IP block and any 2D IP blocks.

Figure 6:
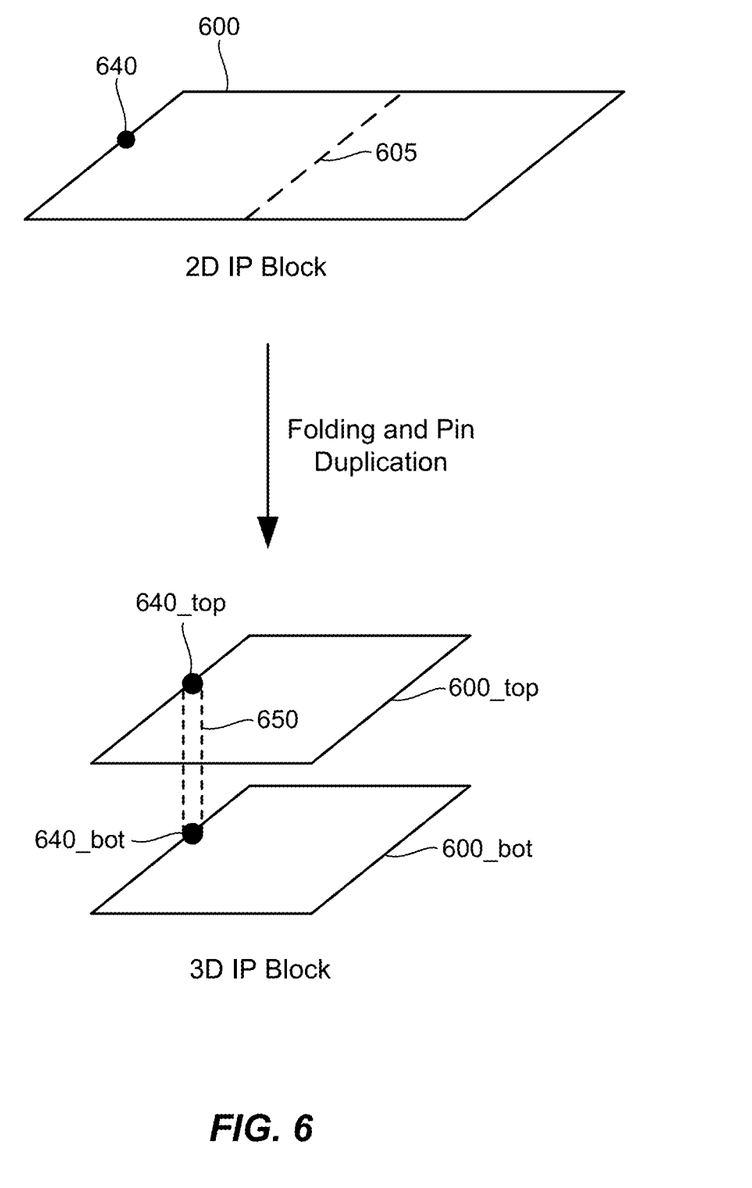
FIG. 6 illustrates an exemplary multi-tier 3D block with duplicated pins that may be created from folding an existing 2D block, according to various aspects.

According to various embodiments, FIG. 6 illustrates an exemplary multi-tier 3D IP block with duplicated pins that may be created from folding an existing 2D IP block, which may be created using the methodology 500 shown in FIG. 5 and described above. More particularly, in various embodiments, an existing 2D IP block 600 may be partitioned about a line 605 into a 3D IP block that has a top tier 600_top and a bottom tier 600_bot, wherein the top tier 600_top and the bottom tier 600_bot may each re-implement placement and routing associated with the existing 2D IP block 600 under the same footprint. Furthermore, the existing 2D IP block may have an I/O pin at location 640, which may be duplicated in the top tier 600_top and the bottom tier 600_bot of the 3D IP block at respective locations 640_top and 640_bot. Accordingly, the duplicated I/O pin may be available at location 640_top and at location 640_bot, thereby making the duplicated I/O pin available in the top tier 600_top and the bottom tier 600_bot. In the folded 3D IP block, the duplicated I/O pins at locations 640_top and 640_bot may be vertically connected using an intra-block TSV 650 inside the folded 3D IP block. Accordingly, other 2D and/or 3D blocks in the final full-chip design may connect to the duplicated pin at either location 600_top or 600_bot depending on the tier location associated therewith. For example, a 2D and/or 3D block in the top tier 600_top or a higher tier in the full-chip layout may connect to the I/O pin at location 600_top, while a 2D and/or 3D block in the bottom tier 600_bot or a lower tier in the full-chip layout may connect to the I/O pin at location 600_bot. As such, duplicating the I/O pin at locations 600_top and 600_bot makes the I/O pin available in more than one tier in the folded 3D IP block such that other blocks (2D and 3D) can easily connect to the I/O pin, and vertically connecting the duplicated pin using the intra-block TSV 650 may save inter-block TSVs and allow a tighter full-chip block-level floorplan.

Figure 7A:
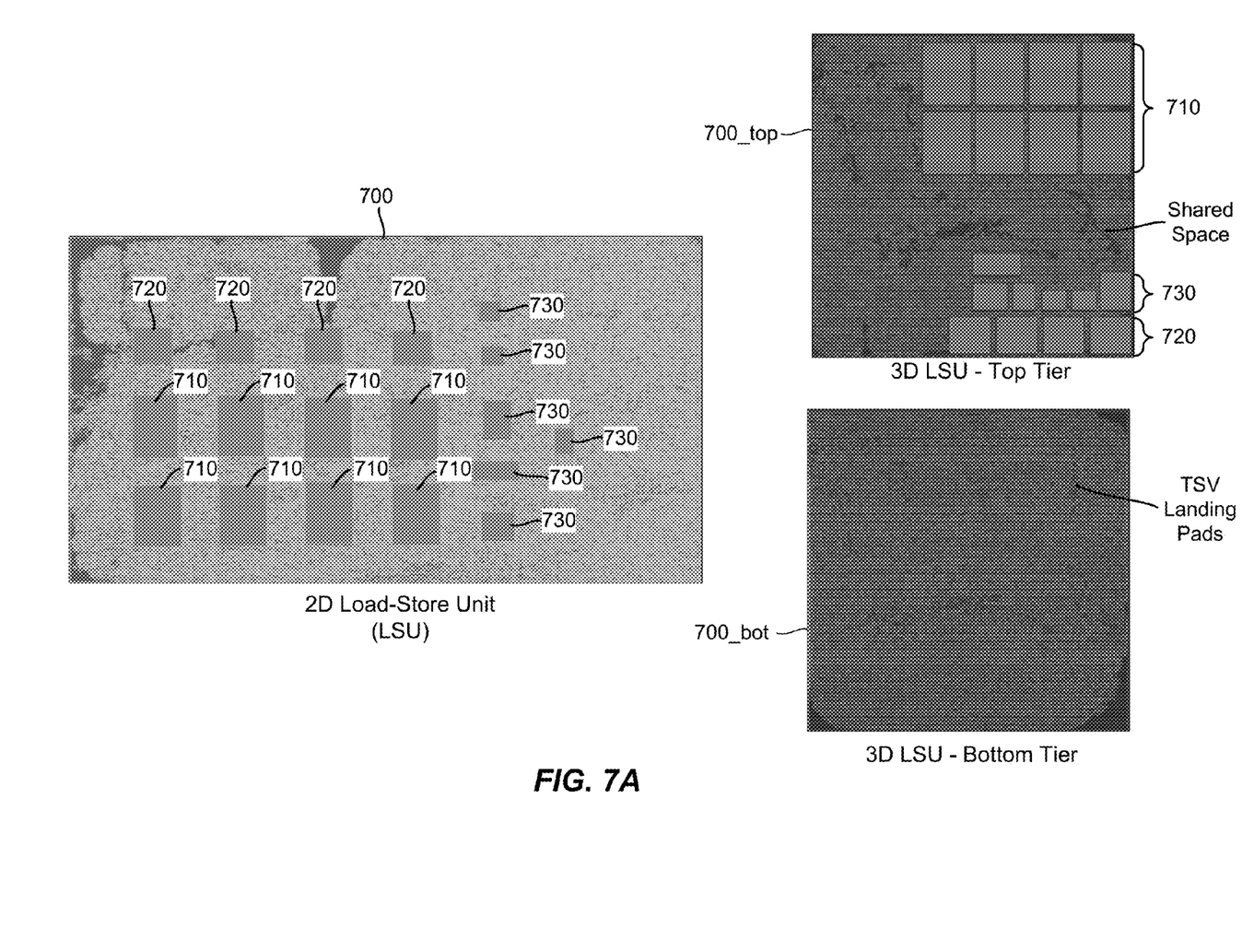
FIGS. 7A-7C illustrates an exemplary 3D load store unit (LSU) with duplicated pins, according to various aspects.
Figure 7B:
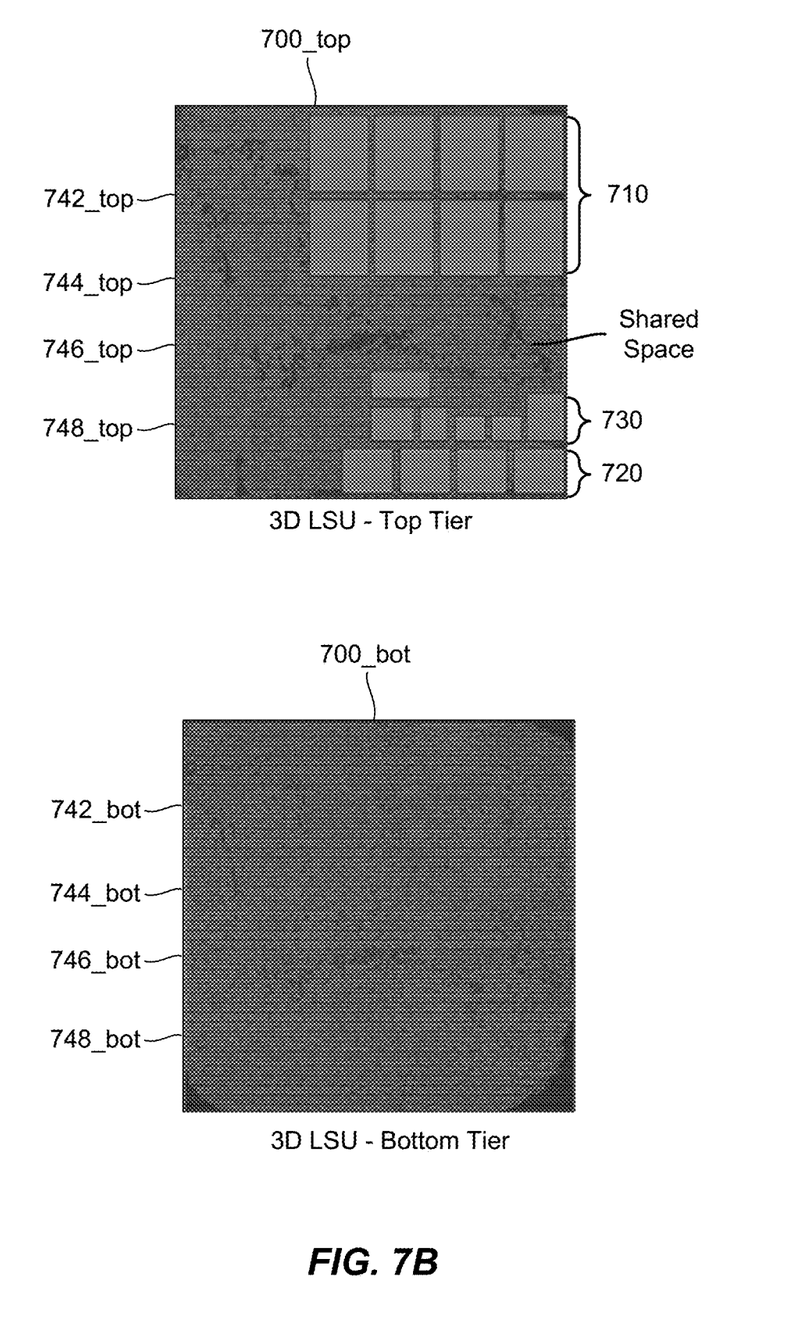
Figure 7C:
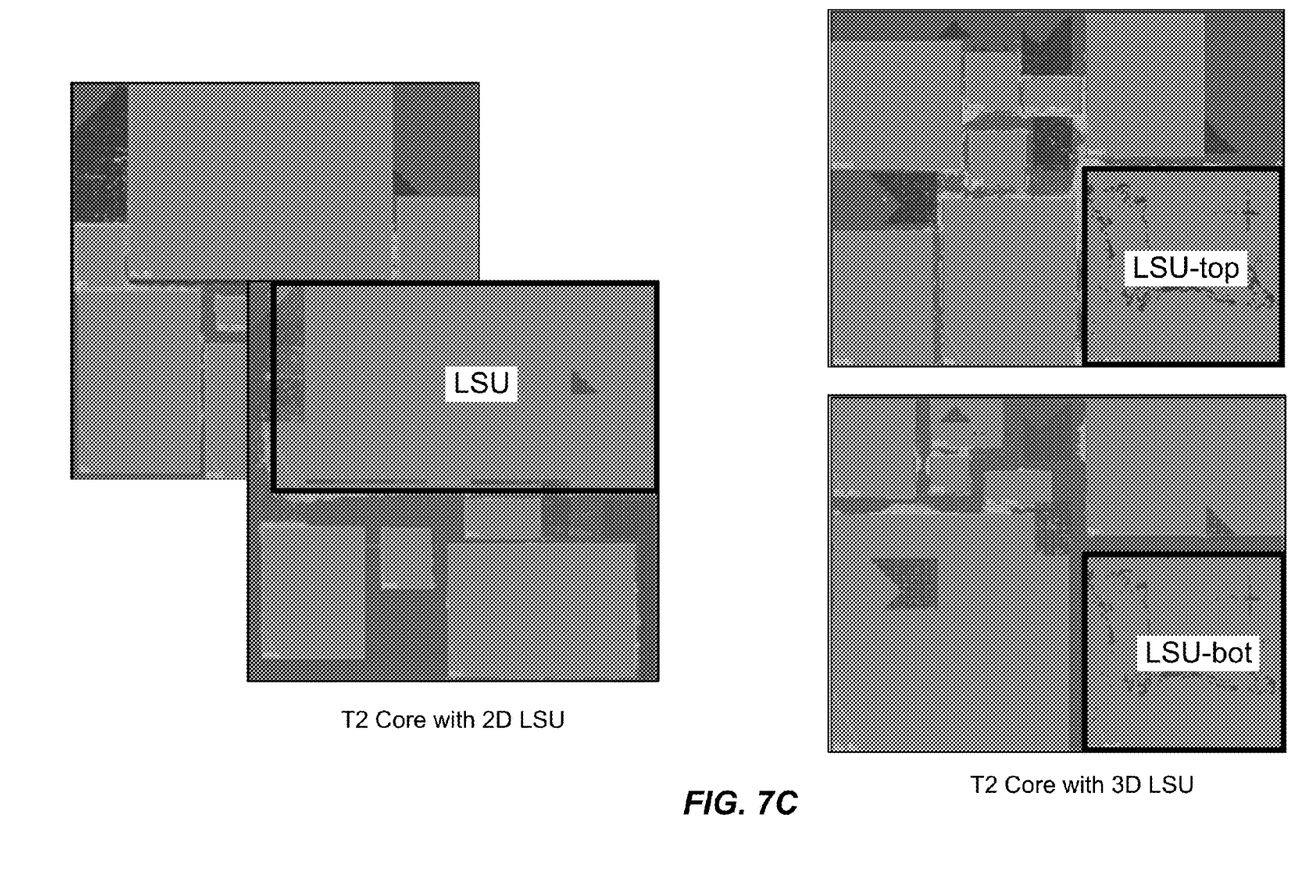

According to various embodiments, FIG. 7A-7C illustrates an exemplary 3D load store unit (LSU) with duplicated pins, which may be created using the methodology 500 shown in FIG. 5 to create a multi-tier 3D IP block having the design shown in FIG. 6. More particularly, FIG. 7A illustrates an exemplary 2D LSU 700 in a processor core (e.g., a core in an OpenSPARC T2 microprocessor that has eight cores and integrates key server functions on a single chip to provide a "server on a chip" architecture). However, those skilled in the art will appreciate that the LSU and OpenSPARC T2 architectures are used herein for illustration purposes only, and that the design principles described herein can be applied in any suitable integrated circuit having foldable 2D IP blocks.

As shown in FIG. 7A, the 2D LSU 700 includes various active elements 710, 720, 730 that are placed at various locations in the 2D LSU 700 and interconnected through appropriate wire routing. Accordingly, in various embodiments, the 2D LSU 700 may be partitioned into a 3D LSU that has multiple tiers, which include at least a top tier 700_top and a bottom tier 700_bot, wherein the top tier 700_top may re-implement the placement associated with the various active elements 710, 720, 730 under a smaller area footprint and the re-implemented routing associated with the 2D LSU 700 may be distributed across the top tier 700_top and the bottom tier 700_bot. As such, folding the 2D LSU 700 into the multi-tier 3D LSU may achieve substantial savings with respect to area footprint (about 50% smaller), wirelength (about 12% less), buffers (about 10% fewer), and power consumption (about 7.5% less). Furthermore, as shown in FIG. 7A, the 3D LSU may have certain shared space available in the top tier 700_top and the bottom tier 700_bot, wherein the shared space may correspond to suitable locations to place TSV landing pads.

In various embodiments, as shown in FIG. 7B, one or more I/O pin placements may then be determined to provide communication paths to the various active elements 710, 720, 730 in the top tier 700_top. In particular, the top tier 700_top may generally comprise various rows that each have various sites that circuit components can occupy. Accordingly, the I/O pin placements may be chosen among rows that have free or otherwise unoccupied sites where an I/O pin can be placed to provide a communication paths to the various active elements 710, 720, 730. For example, a first I/O pin and a second I/O pin may be placed at respective free sites in rows 742_top and 744_top to provide a communication paths to active elements 710, a third I/O pin may be placed at a free site in row 746_top to provide a communication paths to active elements 730, and a fourth I/O pin may be placed at a free site in row 748_top to provide a communication paths to active elements 720. In the bottom tier 700_bot, the I/O pins in the top tier 700_top may be duplicated at rows 742_bot, 744_bot, 746_bot, and 748_bot, respectively, although those skilled in the art will appreciate that one, some, or all I/O pins may be chosen for duplication (e.g., according to a design objective that seeks to minimize total wirelength and the full-chip footprint area). In any case, the duplicated I/O pins are vertically connected using intra-block TSVs (i.e., TSVs placed inside the folded 3D LSU block) such that other 2D and/or 3D blocks can connect to the 3D LSU through either duplicated I/O pin.

Accordingly, FIG. 7C illustrates the processor core implementing the 2D LSU 700 from FIG. 7A compared to the same processor core implementing the folded 3D LSU from FIG. 7A and FIG. 7B once 3D floorplanning has been performed to pack the folded 3D LSU and one or more other blocks into the final full-chip layout. As shown therein, the folded 3D LSU may realize the area footprint, wirelength, power consumption, and other optimizations mentioned above while providing the same functionality as the 2D LSU 700 and easily allowing blocks in either the top tier 700_top or the bottom tier 700_bot to connect to the 3D LSU through the I/O pin duplication and intra-block TSV design principles described in further detail above.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for designing an integrated circuit, comprising:
    folding a two-dimensional (2D) block that has one or more circuit components into a three-dimensional (3D) block having multiple tiers, wherein the one or more circuit components in the folded 2D block are distributed among the multiple tiers in the 3D block;
    duplicating one or more input/output (I/O) pin locations across the multiple tiers in the 3D block; and
    connecting the one or more duplicated I/O pin locations using one or more intra-block through-silicon-vias (TSVs) placed inside the 3D block.

2. The method recited in claim 1, further comprising:
    connecting one or more other blocks in the integrated circuit to one of the duplicated I/O pin locations according to tier locations associated with the one or more other blocks.

3. The method recited in claim 2, further comprising:
    performing 3D floorplanning to pack the 3D block and the one or more other blocks into a full-chip design associated with the integrated circuit.

4. The method recited in claim 3, further comprising:
    choosing the one or more I/O pin locations to duplicate across the multiple tiers in the 3D block to minimize a total wirelength and a footprint area in the full-chip design.

5. The method recited in claim 1, wherein the one or more intra-block TSVs provide a vertical connection between the one or more duplicated I/O pin locations.

6. The method recited in claim 1, wherein the 2D block and the 3D block comprise intellectual property (IP) blocks.

7. The method recited in claim 1, wherein folding the 2D block into the 3D block further comprises:
    partitioning the 2D block into the multiple tiers; and
    re-implementing placement and routing associated with the one or more circuit components in the 2D block to distribute the one or more circuit components in the folded 2D block among the multiple tiers in the 3D block and to interconnect the one or more circuit components distributed among the multiple tiers in the 3D block.

8. The method recited in claim 7, further comprising:
    determining shared space available across the multiple tiers in the 3D block according to the re-implemented placement and the re-implemented routing; and
    placing the one or more duplicated I/O pin locations according to the shared space available across the multiple tiers in the 3D block.

9. A three-dimensional (3D) intellectual property block, comprising:
    multiple tiers;
    one or more circuit components distributed across the multiple tiers; and
    one or more input/output (I/O) pin locations that are duplicated across the multiple tiers.

10. The 3D intellectual property block recited in claim 9, further comprising:
    one or more through-silicon-vias placed inside the 3D intellectual property block, wherein the one or more through-silicon-vias connect the one or more I/O pin locations that are duplicated across the multiple tiers.

11. The 3D intellectual property block recited in claim 10, wherein the one or more through-silicon-vias provide a vertical connection between the one or more duplicated I/O pin locations.

12. The 3D intellectual property block recited in claim 9, wherein the one or more I/O pin locations that are duplicated across the multiple tiers are chosen to minimize a total wirelength and a footprint area in a 3D integrated circuit that includes the 3D intellectual property block.

13. The 3D intellectual property block recited in claim 9, wherein the 3D intellectual property block comprises a two-dimensional (2D) intellectual property block that has been folded into the multiple tiers and re-implemented to distribute and interconnect the one or more circuit components among the multiple tiers in the 3D intellectual property block.

14. The 3D intellectual property block recited in claim 9, wherein the one or more duplicated I/O pin locations are placed in the 3D intellectual property block according to shared space available across the multiple tiers.

15. A three-dimensional (3D) integrated circuit, comprising:
 at least one 3D block having one or more circuit components distributed across multiple tiers and one or more input/output (I/O) pin locations that are duplicated across the multiple tiers; and
 at least one additional block located on one of the multiple tiers, wherein the at least one additional block is connected to one of the duplicated I/O pin locations in the at least one 3D block according to the one of the multiple tiers on which the at least one additional block is located.

16. The 3D integrated circuit recited in claim 15, wherein the at least one 3D block further comprises one or more intra-block through-silicon-vias that connect the one or more I/O pin locations that are duplicated across the multiple tiers in the at least one 3D block.

17. The 3D integrated circuit recited in claim 15, wherein the one or more I/O pin locations that are duplicated across the multiple tiers in the at least one 3D block are chosen to minimize a total wirelength and a footprint area associated with the 3D integrated circuit.

18. The 3D integrated circuit recited in claim 15, wherein the at least one 3D block comprises a two-dimensional (2D) block that has been folded into the multiple tiers and re-implemented to distribute and interconnect the one or more circuit components among the multiple tiers.

19. The 3D integrated circuit recited in claim 15, wherein the one or more duplicated I/O pin locations are placed in the at least one 3D block according to shared space available across the multiple tiers.

20. The 3D integrated circuit recited in claim 15, wherein at least one of the 3D block or the at least one additional block comprises an intellectual property (IP) block.

21. The 3D integrated circuit recited in claim 15, wherein the at least one additional block comprises one or more of a two-dimensional (2D) block or a second 3D block.

* * * * *